United States Patent
Mizrachi et al.

(10) Patent No.: US 7,958,082 B2
(45) Date of Patent: Jun. 7, 2011

(54) APPLICATION DATA REPLICATION BETWEEN COMPUTERS

(75) Inventors: Boaz Mizrachi, Haifa (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 11/550,654

(22) Filed: Oct. 18, 2006

(65) Prior Publication Data

US 2008/0098047 A1  Apr. 24, 2008

(51) Int. Cl.
*G06F 17/30* (2006.01)

(52) U.S. Cl. ........ 707/600; 715/867; 715/718; 715/722; 715/807; 715/233; 713/300; 709/223; 709/224; 709/226; 709/229; 707/999.01; 707/999.102

(58) Field of Classification Search ............. 707/999.01, 707/999.102, 999.101, 999.202, 999.008, 707/999.203; 715/201, 233, 807, 718, 719, 715/722, 867; 709/218, 223, 224, 226, 229; 713/300
See application file for complete search history.

(56) References Cited

U.S. PATENT DOCUMENTS

| | | | | | |
|---|---|---|---|---|---|
| 5,832,514 | A | * | 11/1998 | Norin et al. | 1/1 |
| 6,006,230 | A | * | 12/1999 | Ludwig et al. | 1/1 |
| 6,192,403 | B1 | * | 2/2001 | Jong et al. | 709/224 |
| 7,089,508 | B1 | * | 8/2006 | Wright | 715/867 |
| 7,130,296 | B2 | * | 10/2006 | McNiff et al. | 370/349 |
| 2001/0005860 | A1 | * | 6/2001 | Lazaridis et al. | 709/245 |
| 2003/0050987 | A1 | * | 3/2003 | Lazaridis et al. | 709/206 |

FOREIGN PATENT DOCUMENTS

WO   WO2004053797 A1   6/2004

OTHER PUBLICATIONS

D. Minoura et al., "Adaptive multi-level runlength coding and its implementation into application sharing for a multi-user communication system", Transactions of the Information Processing Society of Japan, v 42, n 12, Dec. 2001, p. 3011-20 Language: Japanese. Abstract only.

ManageSoft Refresh™ Desktop Replication Perfected (*Source*: http://www.managesoft.com/common/docs/pdf/ManageSoft-Desktop_Desktop_Replication_Perfected.pdf).

* cited by examiner

*Primary Examiner* — Jean M Corrielus

(57) ABSTRACT

A method for replicating application data, the method including monitoring at least one application running on a first computer, detecting an inactivity trigger on the first computer, and, responsive to detecting the inactivity trigger, copying data associated with the software application, and placing the copied data in a network-accessible location.

20 Claims, 4 Drawing Sheets

APPLICATION DATA REPLICATION BETWEEN COMPUTERS

FIELD OF THE INVENTION

The present invention relates to replication of application data from one computer to another.

BACKGROUND OF THE INVENTION

Currently, a computer user who uses one or more software applications to work on data on a first computer, such as at the user's workplace, and who might want or need to continue using one or more of the software applications to work on the same data on a second computer, such as at the user's home, may do so by taking copies of the data on portable physical media or by remotely controlling the first computer from the second computer. However, the former option requires users to have access to portable physical media, which users of so-called "thin client" computers often don't have, and to plan ahead, which might be burdensome where the user only occasionally expects to continue working on the data at the second computer, while the latter option typically requires specialized software and that the first computer be left on, in addition to requiring costly network infrastructure and present security problems.

SUMMARY OF EMBODIMENTS OF THE INVENTION

The present invention in embodiments thereof discloses replication of application data from one computer to another.

In accordance with a first aspect of the present invention a method for replicating application data is provided, the method includes monitoring at least one software application running on a first computer, detecting an inactivity trigger on the first computer, and responsive to detecting the inactivity trigger: copying data associated with the software application, and placing the copied data in a network-accessible location.

BRIEF DESCRIPTION OF THE DRAWINGS

Embodiments of the present invention will be understood and appreciated more fully from the following detailed description taken in conjunction with the appended drawings in which.

DETAILED DESCRIPTION OF EMBODIMENTS OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
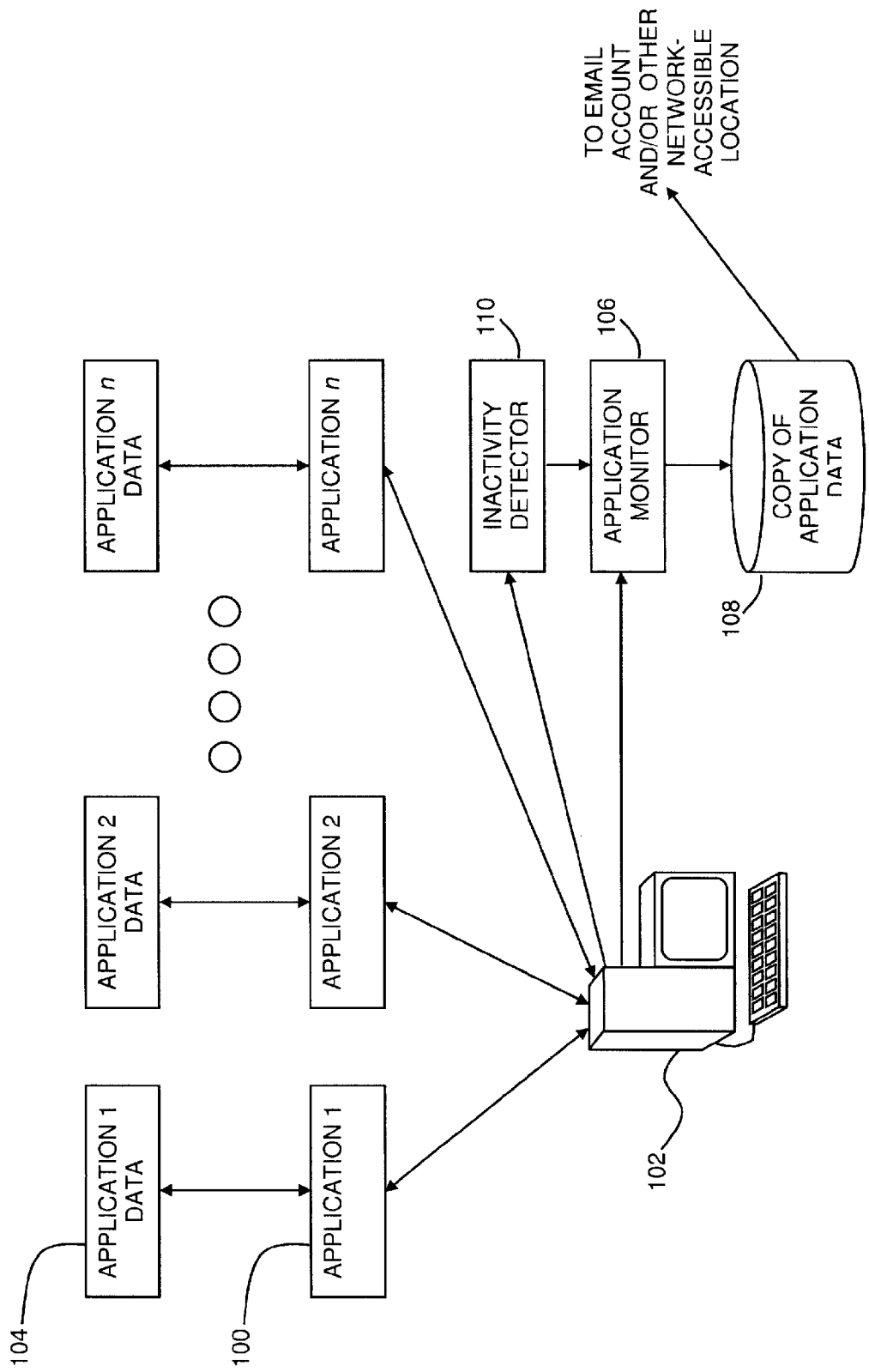
FIG. 1 is a simplified conceptual illustration of a system for replication of application data from one computer to another, constructed and operative in accordance with an embodiment of the present invention.
Figure 2:
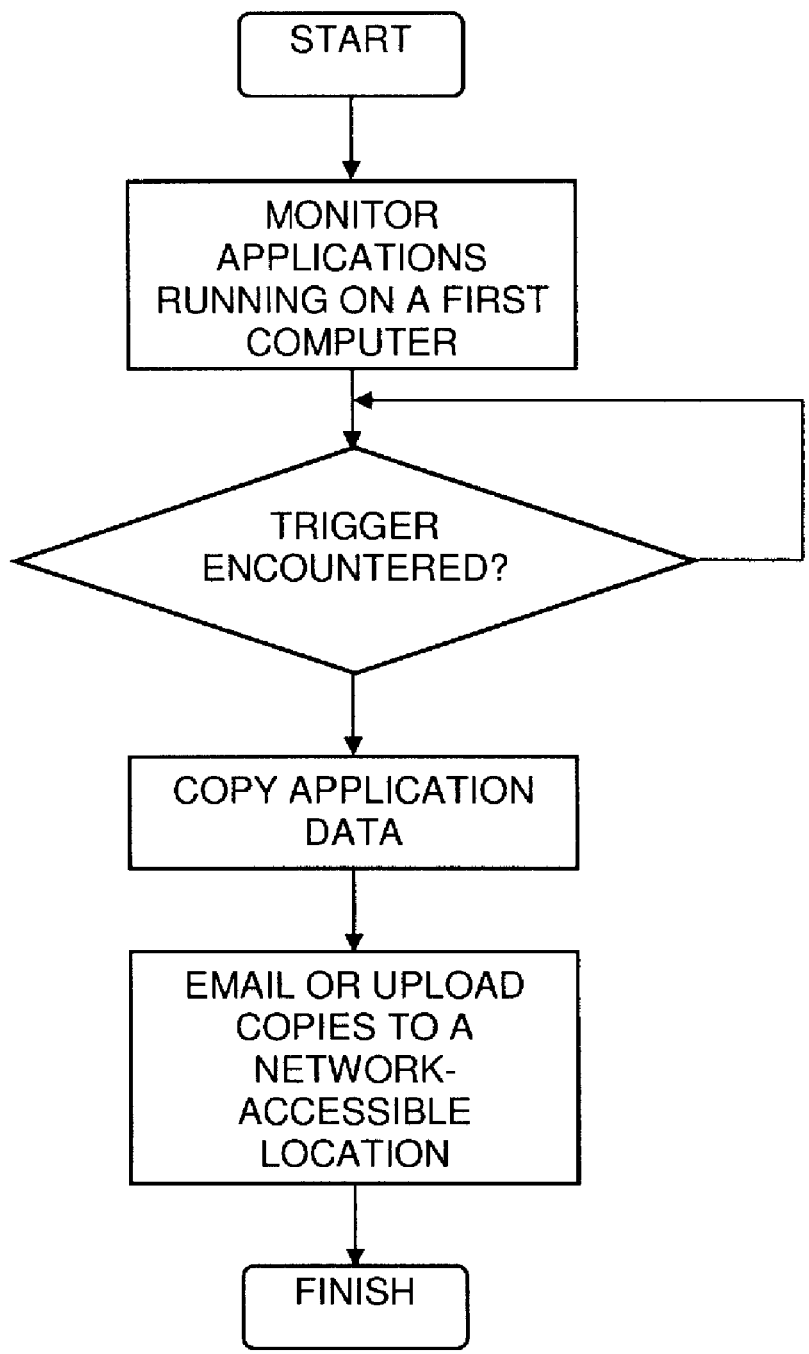
FIG. 2 is a simplified flowchart illustration of an exemplary method of FIG. 1, operative in accordance with an embodiment of the present invention.

Reference is now made to FIG. 1, which is a simplified conceptual illustration of a system for replication of application data from one computer to another, constructed and operative in accordance with an embodiment of the present invention, and additionally to FIG. 2, which is a simplified flowchart illustration of an exemplary method of FIG. 1, operative in accordance with an embodiment of the present invention. In the system of FIG. 1 and method of FIG. 2, one or more software applications 100 are shown running on a computer 102, where each application 100 operates on a corresponding set 104 of application data. An example of application 100 may include Microsoft Word™ whose set 104 of application data includes one or more word processing documents. Another example of application 100 may include MSN Messenger™ whose set 104 of application data includes one or more chat sessions.

Computer 102 is also configured with an application monitor 106 which monitors which applications 100 run on computer 102 and, using conventional techniques, identifies and copies their associated data sets 104, and/or causes applications 100 to create copies of their associated data sets 104, such as by controlling applications 100 to perform a "save as" to save their data to a file. Application monitor 106 may be configured to create these copies of data sets 104 in response to a predefined inactivity trigger, such as may be detected by an inactivity detector 110 which may detect inactivity triggers such computer 102 going for a predetermined length of time without user input, when a screen saver is activated on computer 102, and/or when computer 102 is instructed to enter a sleep mode or to shut down. Application monitor 106 then preferably places the copies of data sets 104, preferably packaged into a single file 108, such as a compressed file, in a network-accessible location, such as by emailing the copies of data sets 104 to one or more predefined email addresses and/or otherwise placing the copies of data sets 104 on a network-accessible computer or other network-accessible storage.

It will be appreciated that application monitor 106 may copy and email/upload data sets 104 that are currently in use by applications 100, and/or data sets 104 that were previously in use by applications 100, such as by keeping track of each application 100 that runs on computer 102, as well as the last n data sets 104 that each application 100 used, and then copying those n data sets for emailing/uploading as described above.

Figure 3:
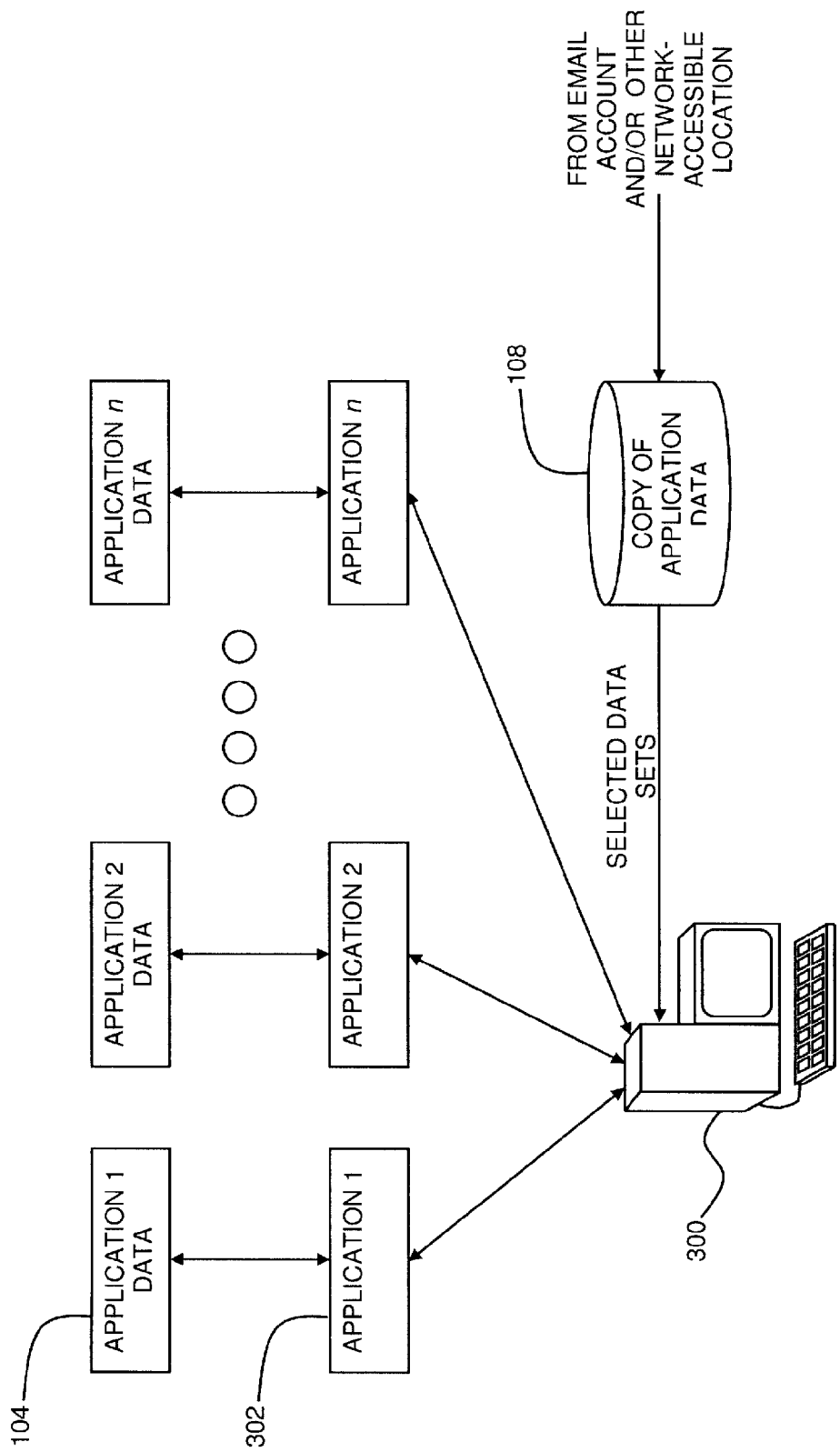
FIG. 3 is a simplified conceptual illustration of a system for working with application data that was replicated from one computer to another, constructed and operative in accordance with an embodiment of the present invention.
Figure 4:
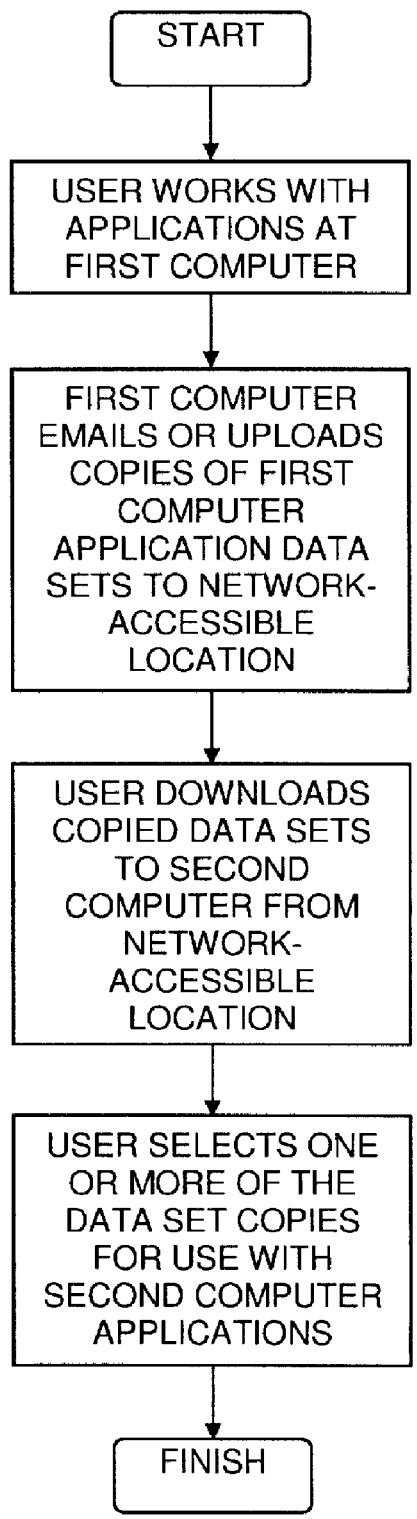
FIG. 4 is a simplified flowchart illustration of an exemplary method of FIG. 3, operative in accordance with an embodiment of the present invention.

Reference is now made to FIG. 3, which is a simplified conceptual illustration of a system for working with application data that was replicated from one computer to another, constructed and operative in accordance with an embodiment of the present invention, and additionally to FIG. 4, which is a simplified flowchart illustration of an exemplary method of FIG. 3, operative in accordance with an embodiment of the present invention. In the system of FIG. 3 and method of FIG. 4, a computer user who worked with applications 100 at computer 102 (FIG. 1) may leave computer 102 and use another computer 300 to retrieve the emailed or otherwise uploaded file 108, open file 108, and select one or more of the copies of data sets 104 within file 108 to work on at computer 300 using one or more applications 302 at computer 300 that are capable of working with the selected data sets 104.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A method of copying application data, the method comprising:
   monitoring a first application running on a first computer;
   detecting an inactivity trigger on said first computer; and
   responsive to detecting said inactivity trigger:
      automatically copying one or more data sets used by said first application, and
      placing said copied data sets in a network-accessible location that is accessible to a second application running on a second computer, wherein said second computer is physically located in a different location than said first computer, and
   wherein said monitoring, detecting, copying, and placing are implemented in either of
      a) computer hardware, and
      b) computer software embodied in a non-transitory computer-readable storage medium.

2. A method according to claim 1 and further comprising:
   retrieving said copied data to said second computer; and
   using said copied data at said second computer with said second application running on said second computer.

3. A method according to claim 1 wherein said copying step comprises causing said application to create a copy of said data.

4. A method according to claim 1 wherein said detecting step comprises detecting that said first computer has gone for a predetermined length of time without receiving user input.

5. A method according to claim 1 wherein said detecting step comprises detecting when a screen saver is activated on said first computer.

6. A method according to claim 1 wherein said detecting step comprises detecting when said first computer is instructed to enter a sleep mode.

7. A method according to claim 1 wherein said detecting step comprises detecting when said first computer is instructed to shut down.

8. A method according to claim 1 wherein said copying step comprises packaging said copied data into a single file.

9. A method according to claim 1 wherein said copying step comprises copying where said data is currently in use by said application.

10. A method according to claim 1 wherein said copying step comprises copying where said data was previously used by said application.

11. A method according to claim 1 wherein said placing step comprises emailing said copied data to at least one predefined email address.

12. A method according to claim 1 wherein said placing step comprises placing said copied data on a network-accessible computer.

13. A method according to claim 1 wherein said placing step comprises placing said copied data on network-accessible storage.

14. A system of copying application data, the system comprising:
   an application monitor configured to monitor a first application running on a first computer; and
   an inactivity detector configured to detect an inactivity trigger on said first computer, wherein said application monitor is configured to
      automatically copy one or more data sets used by said first application, and
      place said copied data sets in a network-accessible location that is accessible to a second application running on a second computer,
      in response to said inactivity detector detecting said inactivity trigger,
   wherein said second computer is physically located in a different location than said first computer, and
   wherein said inactivity detector and said application monitor are implemented in either of
      a) computer hardware, and
      b) computer software embodied in a non-transitory computer-readable storage medium.

15. A system according to claim 14 and further comprising a second computer configured to:
   retrieve said copied data, and
   use said data with a second application running on said second computer.

16. A system according to claim 14 wherein said application monitor is configured to cause said application to create a copy of said data.

17. A system according to claim 14 wherein said inactivity detector is configured to detect that said first computer has gone for a predetermined length of time without receiving user input.

18. A system according to claim 14 wherein said inactivity detector is configured to detect when a screen saver is activated on said first computer.

19. A system according to claim 14 wherein said inactivity detector is configured to detect when said first computer is instructed to enter a sleep mode.

20. A computer program product embedded in a non-transitory computer-readable medium comprising computer program instructions of copying application data sets when executed by a computer causing a processor to:
   monitor a first application running on a first computer,
   detect an inactivity trigger on said first computer, and
   responsive to detecting said activity trigger:
      automatically copy one or more data sets used by said first application, and
      place said copied data sets in a network-accessible location that is accessible to a second application running on a second computer,
   wherein said second computer is physically located in a different location than said first computer, and
   wherein said computer program instructions are stored on said non-transitory computer-readable medium.

* * * * *